US010822060B1

(12) United States Patent
Montestruc

(10) Patent No.: US 10,822,060 B1
(45) Date of Patent: Nov. 3, 2020

(54) MULTI HULL VESSEL WITH MECHANICAL SYSTEMS TO FACILITATE SAFE TRANSFER OF CARGO BY CRANE TO AND FROM VESSEL IN HIGH WAVES

(71) Applicant: Alfred Noel Montestruc, Houston, TX (US)

(72) Inventor: Alfred Noel Montestruc, Houston, TX (US)

(73) Assignee: Allrig, Inc., Houston, TX (US)

( * ) Notice: Subject to any disclaimer, the term of this patent is extended or adjusted under 35 U.S.C. 154(b) by 0 days.

(21) Appl. No.: 16/415,929

(22) Filed: May 17, 2019

(51) Int. Cl.
B63B 39/03 (2006.01)
B63B 39/08 (2006.01)
B63B 11/04 (2006.01)

(52) U.S. Cl.
CPC .............. B63B 39/03 (2013.01); B63B 11/04 (2013.01); B63B 39/08 (2013.01); B63B 2207/02 (2013.01)

(58) Field of Classification Search
CPC .......... B63B 39/03; B63B 39/08; B63B 11/04
See application file for complete search history.

(56) References Cited

U.S. PATENT DOCUMENTS

| 2,889,795 | A |  | 6/1959 | Parks |  |
|---|---|---|---|---|---|
| 3,224,401 | A |  | 12/1965 | Kobus |  |
| 3,273,526 | A |  | 9/1966 | Gloston |  |
| 3,318,275 | A | * | 5/1967 | Field | B63B 1/107 114/122 |
| 3,391,666 | A |  | 7/1968 | Schuller |  |
| 3,616,773 | A |  | 11/1971 | Lloyd |  |
| 3,835,800 | A |  | 9/1974 | Lloyd |  |
| 4,167,147 | A |  | 9/1979 | Bergman |  |
| 5,282,763 | A | * | 2/1994 | Dixon | B63H 25/46 114/144 B |
| 6,761,124 | B1 |  | 7/2004 | Srinivasan |  |
| 6,912,965 | B2 | * | 7/2005 | Leitch | B63B 1/107 114/261 |
| 9,896,159 | B1 | * | 2/2018 | Stackpole | B63G 8/16 |
| 2010/0307401 | A1 | * | 12/2010 | Bereznitski | B66C 23/66 114/122 |
| 2011/0174206 | A1 | * | 7/2011 | Kupersmith | B63B 35/44 114/125 |

* cited by examiner

Primary Examiner — S. Joseph Morano
Assistant Examiner — Jovon E Hayes

(57) ABSTRACT

The subject invention is a design of marine cargo vessel with added mechanical equipment specifically designed to minimize dangerous motions of the vessel induced by high waves while the vessel is being loaded or unloaded from fixed platforms (bottom supported or tension leg) at sea or on inland waters. The vessel uses three means of reduction of such induced motions, which have not before been combined for this purpose. These are a small water plane area multiple hull design, rapid ballasting while loading and unloading, and vertical thrusters.

5 Claims, 4 Drawing Sheets

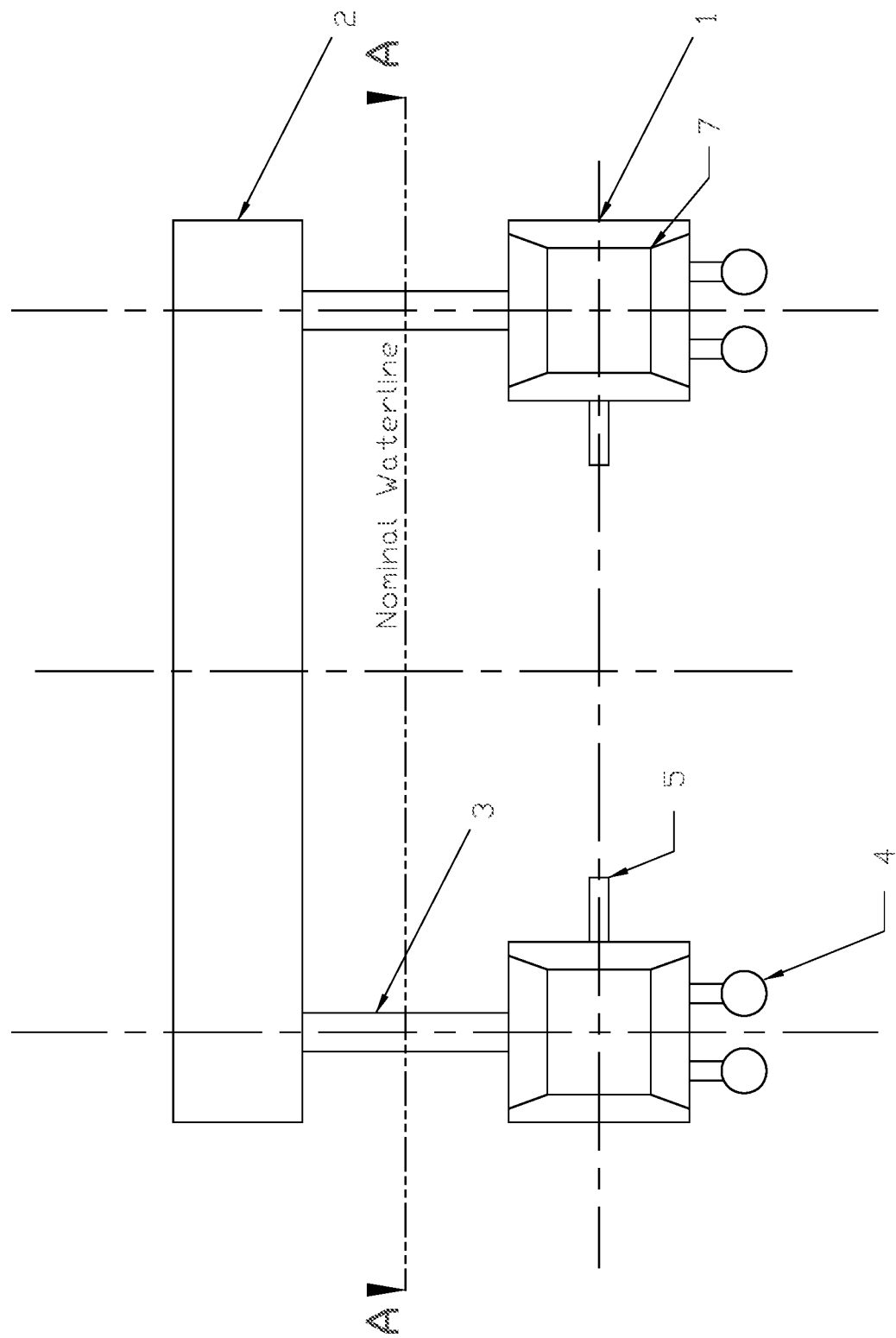
Fig 1 – End View

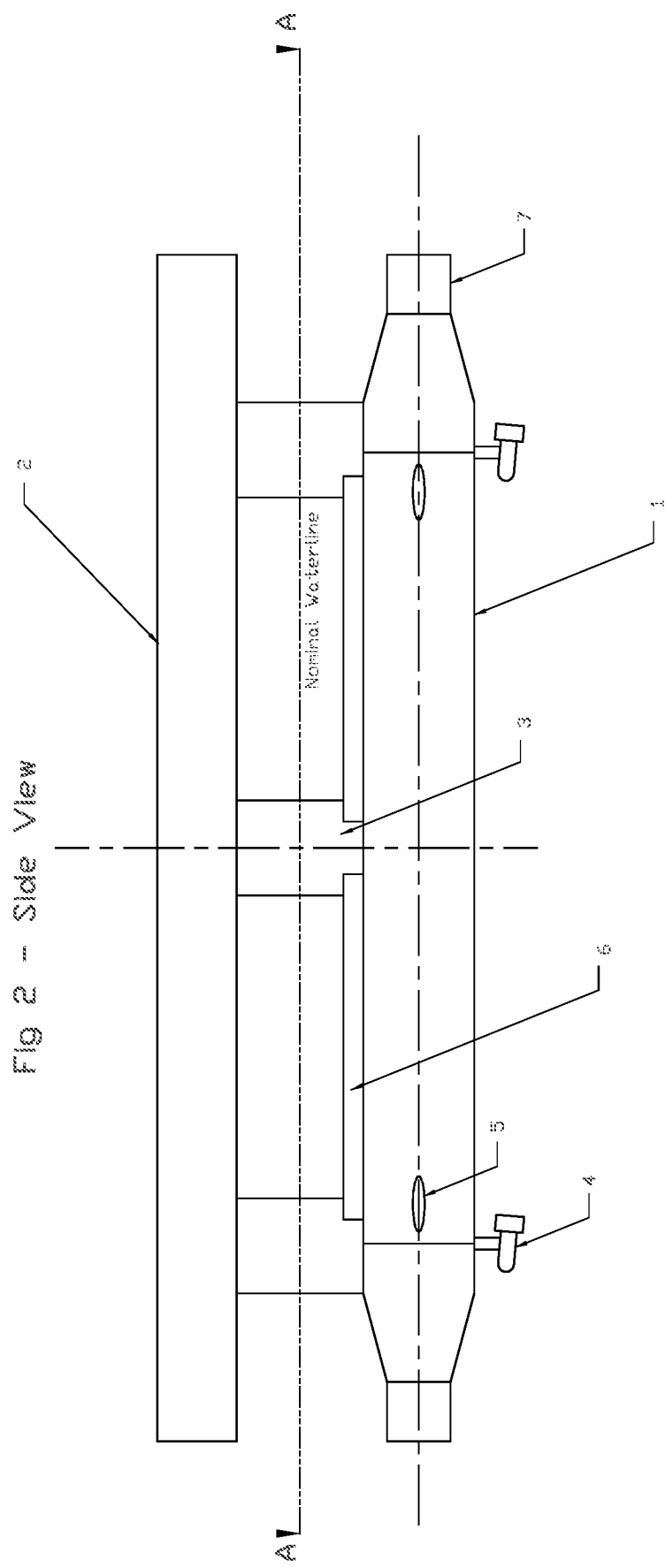

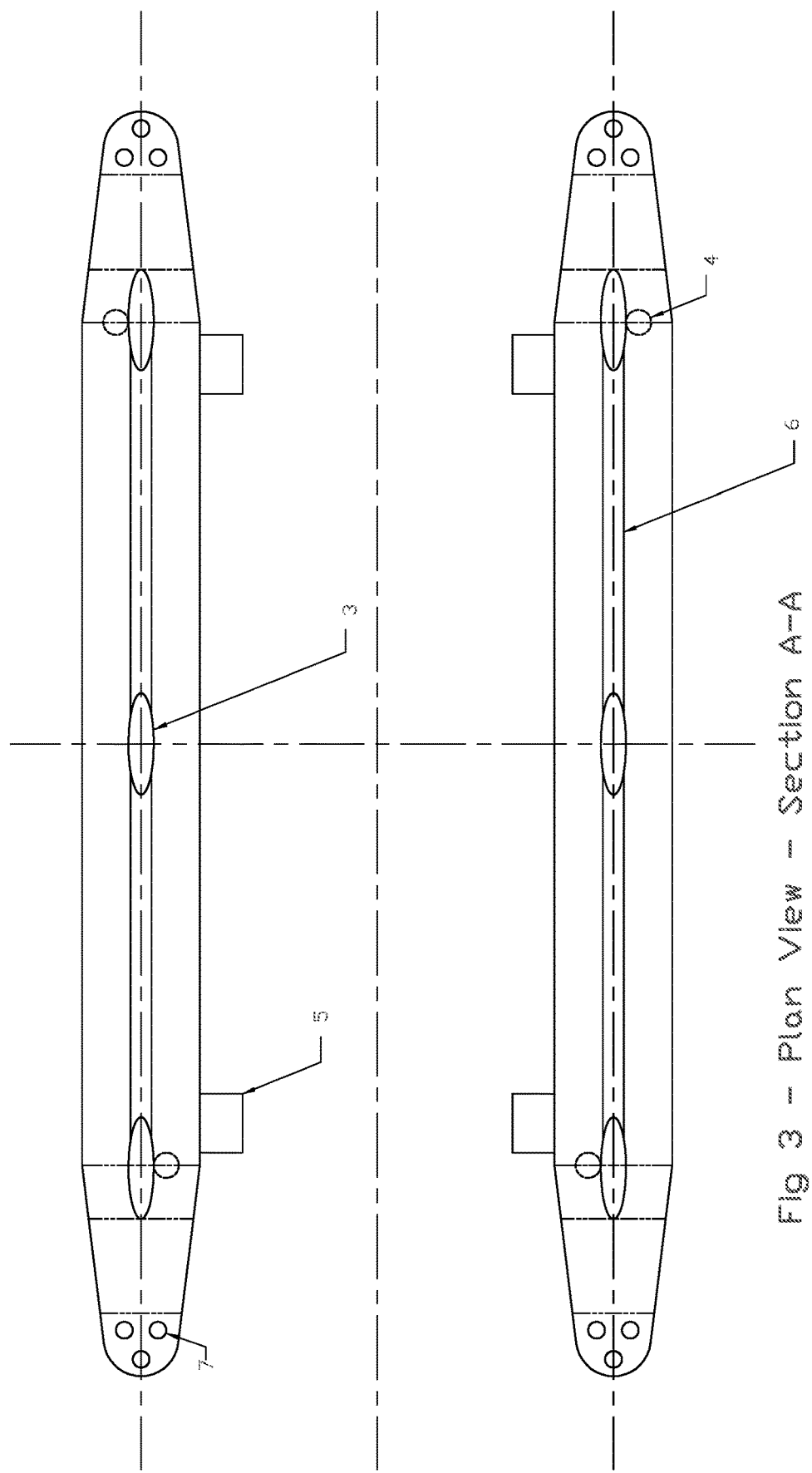

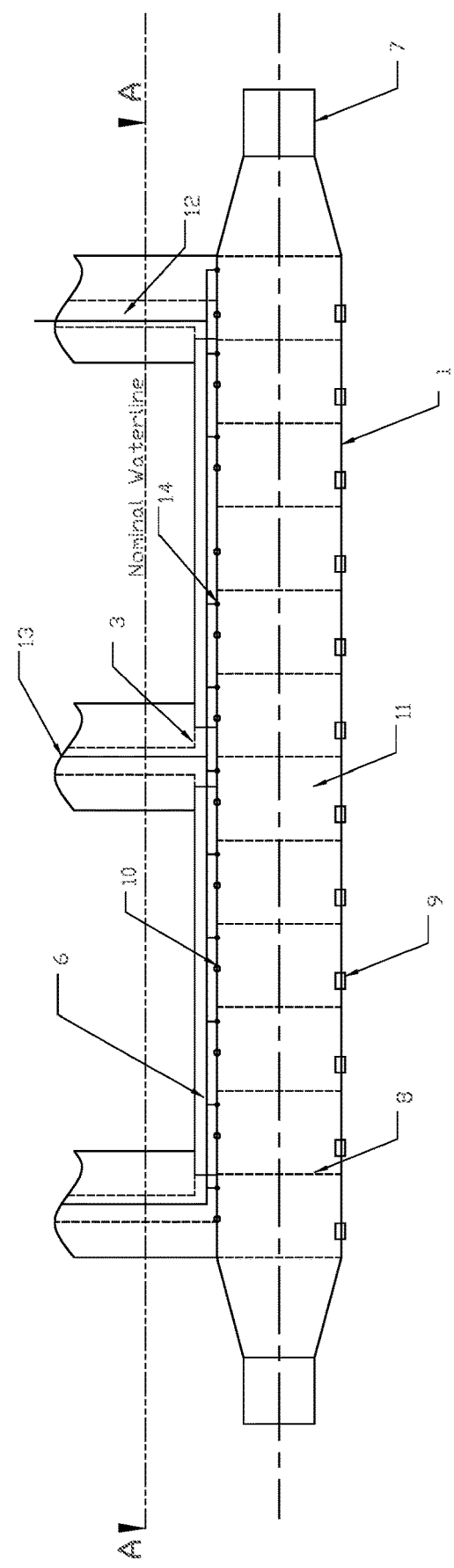
Fig 4 – Side View Showing Ballast Tanks

MULTI HULL VESSEL WITH MECHANICAL SYSTEMS TO FACILITATE SAFE TRANSFER OF CARGO BY CRANE TO AND FROM VESSEL IN HIGH WAVES

REFERENCES CITED

United States Patents

U.S. Pats.

| Pat. No. | Kind Code | Issue Date | Patentee |
|---|---|---|---|
| 2,889,795 | A | 1959 Jun. 9 | Parks |
| 3,224,401 | A | 1965 Dec. 21 | Kobus |
| 3,273,526 | A | 1966 Sep. 20 | Glosten |
| 3,318,275 | A | 1967 May 9 | Field |
| 3,391,666 | A | 1968 Jul. 9 | Schuller |
| 3,616,773 | A | 1971 Nov. 2 | Lloyd |
| 3,835,800 | A | 1974 Sep. 17 | Lloyd |
| 4,167,147 | A | 1979 Sep. 11 | Bergman |
| 5,282,763 | A | 1994 Feb. 1 | Dixon |
| 6,761,124 | B1 | 2004 Jul. 13 | Srinivasan |
| 9,896,159 | B1 | 2018 Feb. 20 | Stackpole et al. |

BACKGROUND—PRIOR ART

The field of the invention is related to the safe transfer of cargo from a floating transport vessel to the deck of a bottom supported, or tension leg structure (called fixed structure hereafter) at sea or on inland waters using a crane, where this crane is generally mounted on the fixed structure. A fundamental technical problem with doing this safely is that a typical cargo vessel will move violently due to waves in rough water conditions, while the fixed structure holds still. This can result in very hard to control and dangerous collisions between the cargo load suspended from the crane and the deck or other cargo on the supply vessel. People have been seriously injured and some killed by such accidents.

In the offshore wind energy industry, the problem is more acute as wind energy economics dictates that windmills be placed where strong steady winds, exist, and anyplace at sea (or on inland bodies of water) that has strong steady winds will have high waves. Thus, this technical problem cannot practically be gotten around by waiting for better weather.

At least two possible approaches to solution exist. First is to develop a crane with motion compensation, the second is to make the boat deck move far less in response to the waves and use a standard much less costly and complex uncompensated crane. The present invention takes the second approach. We shall not investigate the former approach.

We shall look at general prior art in control & minimization of vessel motions due to waves.

Mr. Mercer H. Parks (U.S. Pat. No. 2,889,795 filed on 9 Jul. 1956) invented a means to keep a floating platform supported by vertical roughly cylindrical buoyant modules approximately level using open bottomed ballast tanks in those cylinders and annular closed ballast tanks and a compressed air system to flood or empty any of them in compensation of wave motion or moving heavy equipment on the platform. This method can use automated control to respond to motions of the vessel.

Mr. Lawrence C. Kobus (U.S. Pat. No. 3,224,401 filed on 13 Apr. 1964) invented a means of reducing wave motions of a similar floating platform with the addition of buoyant tubular subsea members between the vertical cylinders. Kobus observed that if the waves had a resonant frequency with the mass moment of inertia of the vessel resonance could cause higher oscillations amplitudes but placing openings in the vertical cylinders such that if the wave height exceeded a specific amount, this would allow water ingress and so change the vessel's mass moment of inertia and so move the resonant frequency. In doing so Kobus seeks to limit and control the motions of the platform in response to waves. In addition, Kobus adds what he calls "damping keels" which increase viscous drag with motion, to tend to damp out motion of the vessel. Kobus's design is a primarily passive system without automated controls. An operator would need to pump out ballast tanks from time to time.

Mr. Lawrence R. Glosten (U.S. Pat. No. 3,273,526 filed on 15 Nov. 1963) invented a design of floating platform that was more intended as an instrument platform for the deep ocean and could be folded to be towed to distant locations. Like Parks, Gloston uses compressed air to fill or empty ballast tanks and control buoyancy. Glosten's vessel stability is principally as the at least three vertical members are quite long and so have large moments of inertia that will substantially resist wave motions.

Mr. Sheldon B. Field (U.S. Pat. No. 3,318,275 filed on 1 Feb. 1965) invented a means of reducing wave motions of a similar floating platform design using an active method specifically using propellers mounted on or near the bottom of the vertical cylindrical columns to create thrust to directly counteract motions induced by waves. This system explicitly relies on automated controls. In one embodiment the propeller is placed in a tunnel but used as a pump to move ballast water into or out of vessel ballast tanks. No such tunnel is used with inlet & outlet as a thruster type tunnel drive.

Mr. Robert E. Schuller (U.S. Pat. No. 3,391,666 filed on 17 Oct. 1966) invented a means of improvement on Park's invention (U.S. Pat. No. 2,889,795 filed on 9 Jul. 1956) where Parks only used a central cylindrical ballast tank open on the bottom and a singular annulus. Schuller added multiple concentric annuli of the plurality of vertical columns each of which could be separately controlled, thus adding finer control of the vessel. In addition, as shown in his drawings he can have a lower totally submerged hull with substantial displacement.

Mr. Samuel Harry Lloyd III (U.S. Pat. No. 3,616,773 filed on 4 Sep. 1968) an invention of a twin submerged hull with a plurality of vertical columns linking the lower hulls with the upper hull for an offshore drilling platform. The height of the stabilizing columns is stated to be somewhat larger than the maximum anticipated storm wave to aid in floating stability. The intended operational draft is stated to be approximately ½ the column height to minimize effects of waves on motion of the vessel. This design has far less water drag along the long axis of the lower hulls than designs of others discussed above. This has obvious value for that invention in allowing faster and more economical transportation of the drilling rig to new locations. It also allows advantages to the present invention as a cargo vessel to have a low drag hull form. The vessel is also explicitly designed as a variable draft vessel such that the elevation of the waterline can be adjusted to the advantage of the vessel, which is also used in the present invention.

Mr. Samuel Harry Lloyd III (U.S. Pat. No. 3,835,800 filed on 9 Jul. 1971) continues his work in this field with a twin hulled crane barge. The hull configuration and ballasting tank arrangements are used to enable the most stable possible used of this hull to support a floating crane. A single hull vessel would have enormously greater amplitude motions due to waves.

Mr. Gunnar B. Bergman (U.S. Pat. No. 4,167,147 filed on 30 Jan. 1978) is primarily a patent on a control system for a semi-submersible which would work on the present invention, this system is could be used with ballasting or with propellers or thrusters.

Mr. John D. Dixon (U.S. Pat. No. 5,282,763 filed on 26 Oct. 1992) invented a design of tunnel thruster that has a swivel outlet on the top of a pontoon. This does not produce vertical thrust but does produce a thrust vector in the horizontal direction of choice of the operator. Which is useful for close quarters maneuvering of a pontoon vessel.

Mr. Nagan Srinivasan (U.S. Pat. No. 6,761,124 filed on 20 Mar. 2003) invented a design of column stabilized semi-submersible that has telescoping ballast tanks that allows the vessel to adjust her vertical center of mass, which will strongly affect her floating stability. Also, that the fact that the columns telescope allows the vessel to get into and out of a harbor with shallower draft than she otherwise might be able to.

Stackpole et al (U.S. Pat. No. 9,896,159 filed on 13 Jun. 2017) includes mention of a vertical tunnel type thruster for a submersible unmanned ROV type vessel.

Our search has uncovered no mention of any other use of a vertically oriented tunnel type thruster, or water jet, on a surfaced marine vessel. Other than Field's mention of the use of vertically mounted propellers to stabilize a drilling platform, we have found no mention of any such device on any surfaced marine vessel as a stability aid against heave, roll or pitch, and certainly none for cargo vessels transporting cargo to fixed structures.

SUMMARY OF THE PRESENT INVENTION

The field of the invention is related to the safe movement of cargo using a standard crane mounted on a fixed structure in rough seas from a floating vessel. For discussion it is assumed that the crane will be on the fixed structure. The problem with motion of the floating vessel with respect to the fixed structure is that these motions can and have caused damage of property or injury or death to crew working on either.

The present invention minimizes motion of the cargo vessel using a combination of three techniques these are:
1. The hull as depicted uses a Small Water Plane Area Twin Hull (SWATH) design. This reduces vessel motions associated with waves relative to the fixed vessel. Specifically heave, pitch and roll motions. The smaller the water plane area, the smaller the force induced. Where the twin hulls are primarily underwater, they are commonly called pontoons, this design as depicted uses pontoons, but need not.
2. Lifting or lowering a large mass off or on to the vessel with a crane could—if done badly—tend to induce a large heave and pitch/roll motions. These can be minimized using ballast tanks and rapid filling or emptying of them to balance the cargo mass being lifted off or placed on the floating vessel while the lift or lower is taking place.
3. While a SWATH hull design has much less roll, pitch or heave than a more traditional hull designs, these motions are not zero, and small roll, pitch or heave motions can cause problems. The present invention introduces a set of vertical thruster drives with substantive offset from the vessel center of mass with significant vertical thrust capability. So long as the reaction time of these thrusters is significantly shorter than the wave period, and the thrusters can equal or exceed the heave force or roll or pitch moment induced on the vessel by the waves, the thruster system can reduce motions due to waves to very low levels.

Minimization of the motion of the vessel during cargo transfer during rough sea conditions is of substantial value to offshore operations in terms of safety of lives and risk of damage to property.

BRIEF DESCRIPTION OF THE DRAWINGS

FIG. 1 shows an end view (bow) of the present invention, the pontoons (submerged lower hull structures), upper hull and struts connecting the pontoons to the upper hull. Z-drives are also shown, as are trim planes. The nominal (operational) water line is shown as approximately half-way between the pontoon and upper hull. Section A-A is indicated looking down from the waterline.

FIG. 2 shows a side view of the vessel. This view in addition to items listed for FIG. 1 shows the air duct on top of the pontoons allowing rapid flow of air into and out of ballast tanks without making bubbles. This is not essential but facilitates more rapid expulsion of air due to less water head. Section A-A is indicated looking down at the waterline.

FIG. 3 shows section A-A which is the plan view of the pontoons looking down from the operational waterline.

FIG. 4 shows the same side view as FIG. 2 but shows a possible arrangement of walls between ballast tanks.

DETAILED DESCRIPTION OF THE INVENTION

The present invention is design of cargo vessel intended to transfer cargo and passengers from port to fixed structure in a safe movement of cargo from the cargo vessel to the fixed structure using either a standard crane mounted on a fixed structure in rough seas, or a standard gangway for passenger and light cargo transfer. It is assumed that the crane will be on the fixed structure. The problem with motion of the floating vessel with respect to the fixed structure is that these motions can and have caused damage of property or injury or death to crew working on either. It is to the benefit of the crews and owners to minimize motions of the floating vessel with respect to the fixed structure to reduce the probability of accidents and minimize the damage caused when one occurs.

The present invention minimizes motion of the cargo vessel using a combination of three techniques these are:
1. The hull uses a Small Water Plane Area Twin Hull (SWATH) design. This hull design is shown in FIG. 1, FIG. 2 and FIG. 3. The two pontoons (1) are always intended to be below water's surface during operations, the upper hull (2) is always intended to be out of the water, a plurality of struts (3) connect the pontoons (1) and upper hull (2) and penetrate the water's surface. No specific number of struts, or size of strut, should be inferred other than at least one per pontoon. The struts (3) should have substantively lower cross-sectional area that penetrates the water's surface than normal for a mono hulled cargo vessel of similar displacement, that means a low force induced for a given wave height. The smaller the water plane area, the smaller the wave induced vertical force. If the water plane area is small with respect to the mass and moment of inertia of the vessel, the wave induced accelerations, that cause heave, roll and pitch motions are smaller. While the vessel is in a transit mode moving from one place to another trim planes (5) are used to counter roll and pitch motions of the vessel, these are shown in FIGS. 1, 2 & 3. The vessel is propelled both in transit mode and in station keeping while loading or unloading cargo as regards surge, sway and yaw motions by plurality of Z-drives (4) also shown in FIGS. 1, 2 & 3.

2. An observer might note, is that in that lifting or lowering a large mass off or on to the vessel with a crane may—if done carelessly—tend to induce a large heave and pitch/roll motions. With a SWATH type vessel, the reactions will be slower, but can still be quite dangerous. This can be much mitigated using ballast tanks (11) shown in FIG. 4 and rapid filling or emptying of them to balance the cargo mass lifted off or placed on the floating vessel while such loading is done such that the net displacement change is small. In FIG. 4 one possible arrangement of boundaries (8) between ballast tanks are shown. The tops of the ballast tanks have vent valves (10) that open the top of the ballast tanks (11). Typically, the valves open into ducts (6) seen in FIG. 4. In the preferred embodiment, the air ducts (6) connect to air ducts (12) going to the upper hull through the struts (3). The bottom of each ballast tank will have at least one sea chest (9) with a large valve opening to the sea. A compressed air system with high pressure air lines (13) and appropriate high-pressure air valves (14) opening into each ballast tank (11). Said high pressure air lines (13) that also may run through the struts (3) and air ducts (6), allows each ballast tank to be filled with high pressure air if the upper air vent valve (10) is shut, and lower sea-chest (9) valve is open emptying water out of the ballast tank. Thus, tanks can be quickly filled or emptied by the operator. The general procedure for unloading is as follows;

a. The operational procedure to lift a heavy load off the floating vessel is to pre-plan the lift knowing which ballast tanks to fill and how much to fill them to balance the weight and position of the cargo lifted off.
   b. Move the vessel into position such that the crane on the fixed vessel can reach.
   c. Hook up the cargo on the deck and apply very light tension not more than a small percentage of the cargo mass.
   d. Then flood the pre-planned ballast tanks uniformly to the planned load. This will increase tension on the crane lines as the floating vessel settles slightly. When fully done, you should have a small amount of air gap between the cargo and floating vessel's deck. You can safely lift the cargo away now.
   e. This process is reversed (moving into position, lowering to a gentler low force touch, then empty the correct ballast tanks till the crane lines are slack) to load a heavy cargo on the vessel.

3. Another thing an observer may note, is that while a SWATH hull design has much less roll, pitch or heave than a more traditional hull designs, these motions are not zero in rough waters, and small roll, pitch or heave motions might still cause problems. The present invention introduces a set of vertical thruster drives (7) with substantive offset from the vessel center of mass with significant vertical thrust capability. These are shown most clearly in FIG. 3. A system of 12 vertical tunnel thrusters that penetrate the pontoon hull are shown, three near each end of each pontoon. However, no specific type or number or location of vertical drive should be inferred as required. A tunnel thruster, a jet drive, or vertical propellers could be used, possibly other drives as well. The requirement is for controlled vertically directed thrust both positive and negative as needed to counter heave forces and roll or pitch moments. So long as the reaction time of these thrusters is significantly shorter than the wave period, and the thrusters can equal or exceed the heave force or roll or pitch moment induced on the vessel by the waves, the thruster system can much reduce motions of the vessel due to waves. It is expected that the thruster system will use an automated computer control system designed to keep the vessel level and minimize roll, pitch and heave motions using the thrusters. It ought to be noted that the thruster discussed will not work well when the vessel is in transit mode and moving at a significant velocity through the water. Trim planes (5) are used to counter roll and pitch motions of the vessel, these are shown in FIGS. 1, 2 & 3. These should be used to control pitch and roll motions in transit.

Minimization of the motion of the vessel during cargo transfer during rough water conditions is of substantial value to offshore operations in terms of safety of lives and risk of damage to property.

I claim:

1. A cargo or mixed cargo/passenger vessel for use at sea or in freshwater bodies comprising; a. at least two submerged lower hull structures with total displacement enough to support at least 60% of the vessel mass; b. said lower hull structures to be connected to an upper hull structure by a plurality of vertical structures that cut through the nominal waterline with total water plane area less than 50% of what would be the sum of the centerline waterplane area of the lower hull structures, and said upper hull structure intended to be kept out of the water and hold cargo on, or in it; c. the upper hull supported by said vertical structures high enough above the lower hulls to have a design specified wave, with specified height & wave time period, pass between lower and upper hull structures without the upper hull touching the water's surface when the vessel is level; d. a significant improvement of cargo handling comprising that said lower hull structures to be subdivided into a plurality of water-tight compartments which shall include a plurality of ballast tanks each ballast tank of which can be filled or emptied with water using valves to the sea and air and to a high pressure air system, of not less than 5 atmospheres in pressure, to control vessel center of mass, water line level of the vessel while loading or unloading the vessel using a crane by filling or emptying ballast tanks in less than 15 wave periods, while cargo loads are gradually transferred from the vessel to the crane, thus stopping sudden changes in vessel center of mass or displacement as the vessel is loaded or unloaded.

2. The vessel of claim 1, to which is added an additional improvement consisting of a plurality of vertically oriented submerged thrusters offset from the center of mass of the vessel that have thrust capacity to aid in resisting, roll, pitch or heave motions induced on the vessel by waves of a design specified size while the vessel is moving less than 4 knots or is stationary.

3. A vessel intended for cargo and/or passenger transport on the ocean or inland waters which shall be constructed and arranged to minimize roll, pitch and heave motions as follows: a. shall have at least two lower submerged structures and one upper structure above water for cargo and passengers with a plurality of vertical structures that link the two; b. the vertical structures shall generally penetrate the surface of the water with total cross-sectional area less than 50% of the lower structures sum maximum horizontal cross-section area as the vertical structures penetrate the water's surface; c. the vessel shall have a specified maximum design wave for cargo transfer operations with specified height and time period; d. a major improvement in cargo handling safety being that in addition each lower hull shall be each subdivided into water tight compartments a substantial fraction of which may be used as ballast tanks, each ballast tank will have a sea chest with at least one valve on or near the bottom of that tank with flow capacity to allow each tank to be filled or emptied in 15 wave periods or less, and each ballast tank shall have a vent valve allowing air to escape from the ballast tanks while they are filled from the water in the same period, said air may flow through ducts leading from the ballast tanks on the top of the lower hull through the vertical structures and then to the upper hull, to be vented; e. an additional improvement added is a high-pressure air system—not less than 5 atmospheres in pressure—with high pressure air lines and valves may run in or parallel to the said ducts to each ballast tank to allow said high pressure air to be used to push water out of the ballast tanks through the sea chest valves as designated by the operator.

4. The vessel of claim 3 to which is added a plurality of vertically oriented thrusters attached to the submerged lower hulls and well offset from the center of mass of the vessel, which allow the operator, or a computer control system, to induce roll, pitch or heave motions on the vessel as desired, but mainly to counter motions induced by waves.

5. A vessel intended to transport cargo which is to be carried on that vessel in individual crane loads of one or more metric tons, which is intended to be loaded or unloaded by a crane that is mounted either on a bottom or land supported structure, or tension leg structure, not the floating vessel, to which is added;

- a. A plurality of submerged lower hull structures with enough displacement in total to support not less than 60% of the total vessel mass;
- b. An upper hull in or on which cargo and/or passengers are carried;
- c. Connecting structures between the lower hulls and upper hull with total water plane area 50% or less than the total maximum horizontal section area of the lower hulls, the vessel designed for cargo transfer operations at a specific wave height or less, and time period, and cargo mass or less;
- d. Said submerged lower hulls are advantageously subdivided into a plurality of water-tight compartments, where a substantial number of such compartments are arranged as ballast tanks with sea-chests with valves, on the bottom of each tank and air vent valves on the top of each tanks, venting out to the surface, and a high pressure air system of at least 5 atmospheres pressure with a valve for each ballast tank, allowing high pressure air inlet to each tank, allowing filling and emptying of each tank while loading or unloading 25% of the total design cargo mass within 15 wave periods, to maintain an approximately constant center of gravity and displacement during loading or unloading;
- e. An added plurality of vertically oriented thrusters attached to, or made part of the submerged lower hulls, and well offset from the center of mass of the vessel, which allow the operator, or a computer control system, to induce roll, pitch or heave motions on the vessel as desired, and also to counter motions induced by waves or sudden loading or offloading of cargo.

* * * * *